(12) United States Patent
Anil et al.

(10) Patent No.: US 6,657,501 B1
(45) Date of Patent: Dec. 2, 2003

(54) INSTANTANEOUS START UP OSCILLATOR

(75) Inventors: K. S. Anil, Bangalore (IN); Rajat Gupta, Bangalore (IN)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/596,814

(22) Filed: Jun. 19, 2000

(51) Int. Cl.[7] .................................................. H03B 5/06
(52) U.S. Cl. .......................... 331/49; 331/143; 331/158
(58) Field of Search ............................ 331/49, 143, 158

(56) References Cited

U.S. PATENT DOCUMENTS

| | | | |
|---|---|---|---|
| 5,151,613 A | * | 9/1992 | Satou et al. .................. 331/49 |
| 5,196,810 A | * | 3/1993 | Graether et al. .............. 331/49 |
| 5,623,234 A | * | 4/1997 | Shaik et al. .................. 331/49 |
| 6,157,265 A | * | 12/2000 | Hanjani ........................ 331/49 |

OTHER PUBLICATIONS

K.S. Anil et al., "Compensation of Crystal Start up for Accurate Time Measurement", U.S. Ser. No. 09/596,522, filed Jun. 19, 2000.

* cited by examiner

*Primary Examiner*—David C. Mis
(74) *Attorney, Agent, or Firm*—Christopher P. Maiorana, P.C.

(57) ABSTRACT

An apparatus comprising a first oscillator, a second oscillator and a logic circuit. The first oscillator circuit may be configured to generate a first clock signal. The second oscillator circuit may be configured to generate a second clock signal. The logic circuit may be configured to generate an output clock signal by selecting either the first clock signal or the second clock signal.

21 Claims, 3 Drawing Sheets

INSTANTANEOUS START UP OSCILLATOR

CROSS REFERENCE TO RELATED APPLICATIONS

The present application may relate to U.S. Ser. No. 09/596,522, filed Jun. 19, 2000, which is hereby incorporated by reference in its entirety.

FIELD OF THE INVENTION

The present invention relates to a method and/or architecture for crystal oscillators generally and, more particularly, to a method and/or architecture for instantaneous start up crystal oscillators.

BACKGROUND OF THE INVENTION

Conventional oscillators cannot generate an accurate system clock during a start up condition. In particular, when time keeping accuracy, frequency stability with respect to time and quick start up is required, conventional oscillators are not adequate.

In applications using micro controllers, if an oscillator has not started up when a power-on-reset (POR) is lifted, the microcontroller can hang. A watchdog timer (WDT) has to be implemented to return the system to a normal mode of operation. Using the watchdog timer will cause significant error (i) if the system is used for time measurement from power up and/or (ii) if an application cannot tolerate the inevitable blackout associated with recovery driven by the watchdog timer.

SUMMARY OF THE INVENTION

The present invention concerns an apparatus comprising a first oscillator, a second oscillator and a logic circuit. The first oscillator circuit may be configured to generate a first clock signal. The second oscillator circuit may be configured to generate a second clock signal. The logic circuit may be configured to generate an output clock signal by selecting either the first clock signal or the second clock signal.

The objects, features and advantages of the present invention include providing a method and/or architecture for generating an instantaneous frequency during a start up condition that may (i) provide an accurate oscillator frequency after a power start up, (ii) link an RC oscillator based power on reset (POR), (iii) implement a POR that does not lift before the oscillator starts up, (iv) reduce usage of a watchdog timer (WDT) for reset related system recovery, (v) provide for graceful (e.g., non-abrupt) degradation in environments where a crystal oscillator (a) stops, (b) stalls and/or (c) fails (e.g., high "g" and high background EMI applications), (vi) provide high accuracy power levels, (vii) provide high accuracy over wide voltage and temperature variations, and/or (viii) provide a robust solution for applications that require microprocessors to receive or respond to external events from power up.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
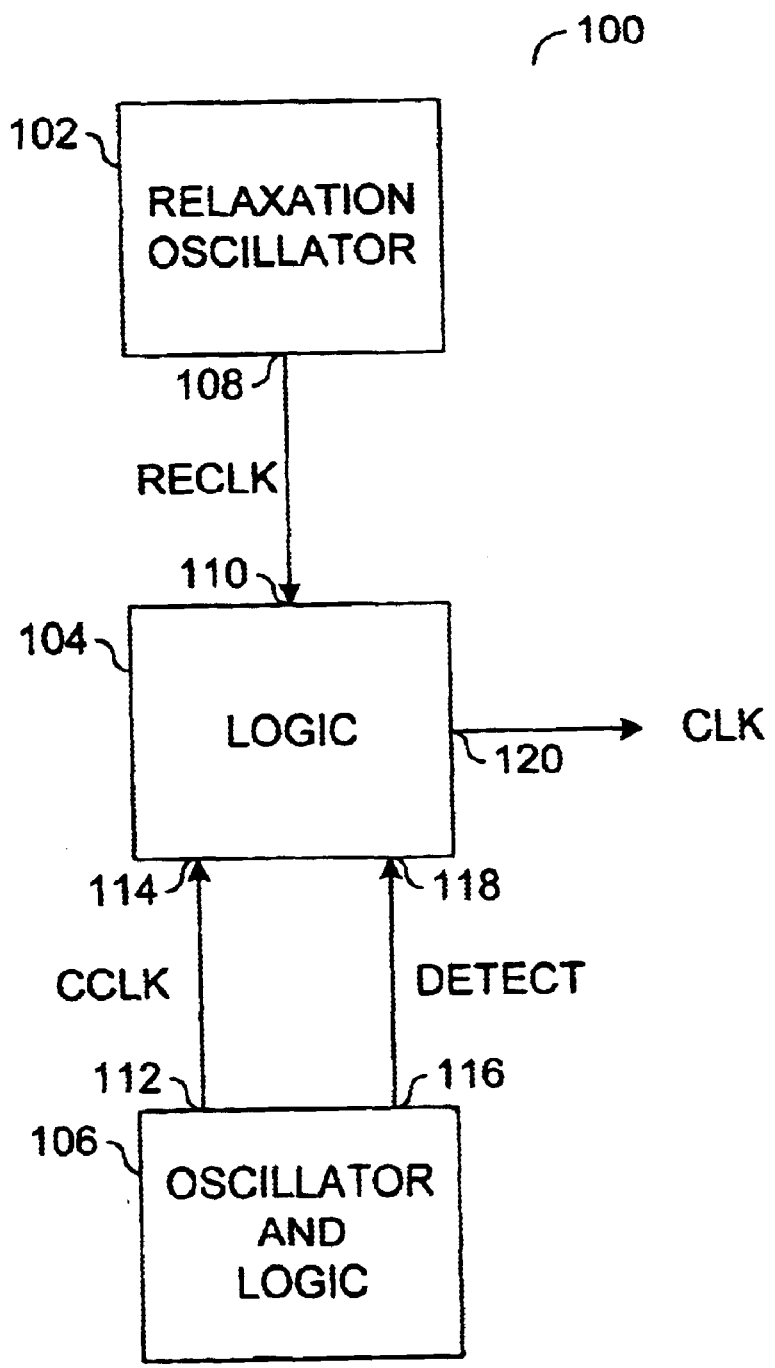
FIG. 1 is a block diagram of a preferred embodiment of the present invention.

Referring to FIG. 1, a block diagram of a circuit 100 is shown in accordance with a preferred embodiment of the present invention. The circuit 100 generally comprises an oscillator block (or circuit) 102, a logic block (or circuit) 104 and an oscillator and logic block (or circuit) 106. The oscillator block 102 may be implemented, in one example, as a relaxation oscillator (RC) However, other oscillators may be implemented accordingly to meet the design criteria of a particular implementation. For example, the oscillator block 102 may be implemented as another appropriate type of oscillator with instantaneous start-up characteristics. The relaxation oscillator 102 may have an output 108 that may present a signal (e.g., RECLK). The signal RECLK may be presented to an input 110 of the logic block 104. In one example, the signal RECLK may be implemented as a relaxation oscillator (RC) reference clock.

The oscillator and logic block 106 may have an output 112 that may present a signal (e.g., CCLK). The signal CCLK may be presented to an input 114 of the logic block 104. In one example, the signal CCLK may be implemented as a crystal reference clock or other accurate clock. The oscillator and logic block 106 may also have an output 116 that may present a signal (e.g., DETECT) to an input 118 of the logic block 104. The logic block 104 may have an output 120 that may present a signal (e.g., CLK). The signal CLK may be presented in response to the signal RECLK, the signal CCLK and the signal DETECT. In one example, the signal CLK may be implemented as a system clock. Alternatively, the signal CLK may be used to derive a number of clock signals or may be used to clock a number of devices. In general, the logic block 104 may present either (i) the signal RECLK generated by the relaxation oscillator block 102 or (ii) the signal CCLK generated by the oscillator and logic block 106 as the system clock CLK. The logic block 104 may select between the signal RECLK or the signal CCLK in response to the signal DETECT. Additionally, the logic block 104 may select an appropriate clock (e.g., the signal RECLK or the signal CCLK) after a delay. However, the circuit 100 may be configured to present the signal CLK in response to another appropriate signal and/or circumstance in order to meet the criteria of a particular implementation.

In particular, certain applications may require microprocessors to receive or respond to external events from power up. The microprocessors may not permit for relatively long start up times, typically required by crystal oscillators. However, relaxation oscillators may not be acceptable in such applications due to inaccuracies. The circuit 100 may provide an instantaneous and accurate clock frequency (e.g., the clock CLK). The circuit 100 may provide the instantaneous and accurate clock CLK by selecting the signal RECLK during a start up stage and switching to the signal CCLK after a predetermined or dynamically calculated time delay. The time delay may allow the signal CCLK to stabilize.

The circuit 100 may start up implementing the signal RECLK from the relaxation oscillator. The circuit 100 generally switches over to the signal CCLK after the oscillator and logic block 106 has stabilized. The circuit 100 may compensate for any accumulated error due to inaccuracy of the RC oscillator 102. After the compensation, clock pulses presented as the signal CLK, at any point of time, will generally be the same as if a crystal oscillator (to be described in connection with FIG. 2) had started instantaneously. The relaxation oscillator 102 generally causes the circuit 100 to present the signal CLK from the instant power is applied.

Figure 2:
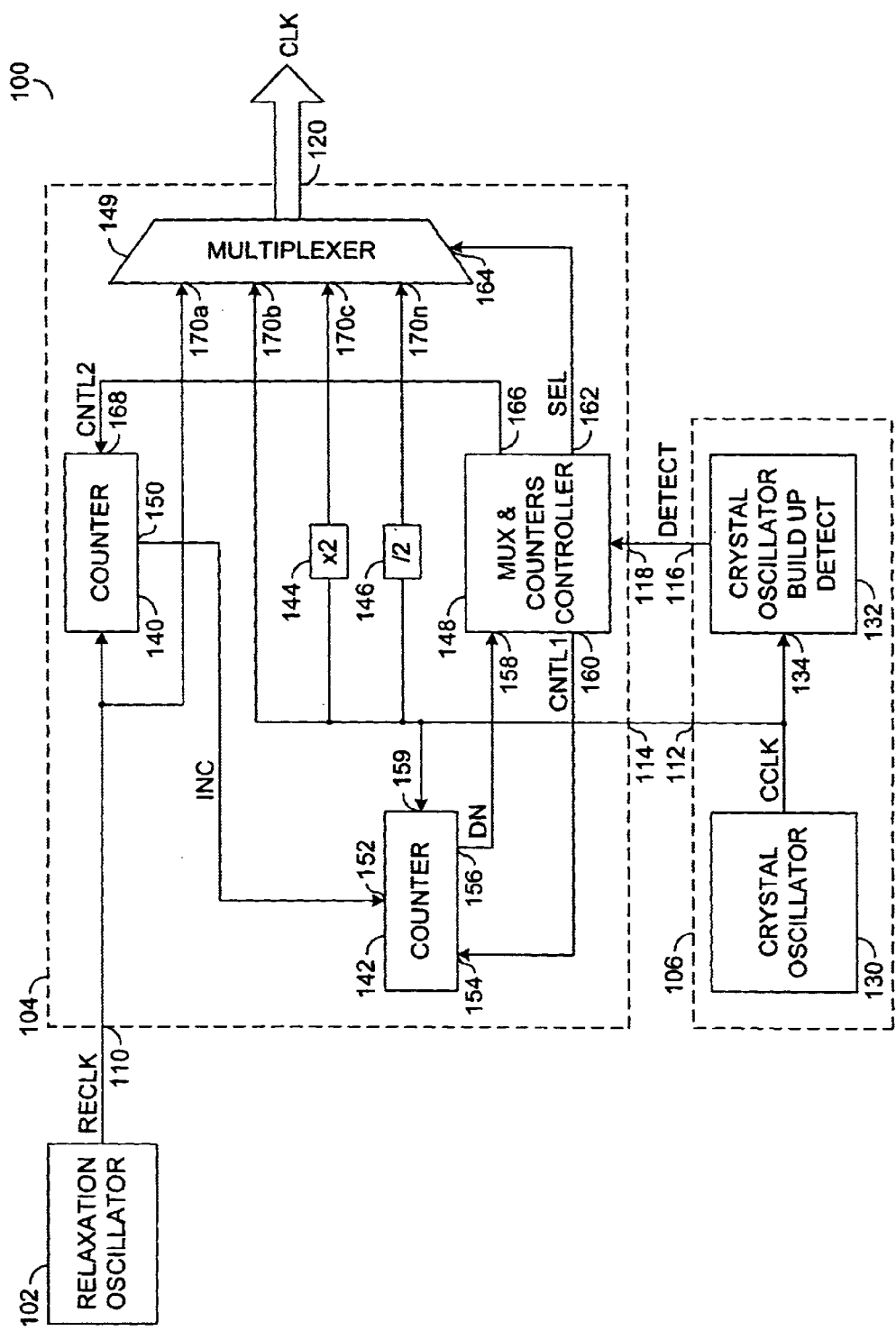
FIG. 2 is a detailed block diagram of the present invention.

Referring to FIG. 2, a more detailed diagram of the circuit 100 is shown. The circuit 106 is shown comprising a crystal oscillator 130 and a crystal oscillator build up detect circuit 132. The crystal oscillator 130 generally presents the signal CCLK to both the input 114 of the logic circuit 104 and to an input 134 of the crystal oscillator build up detect circuit 132. The crystal oscillator build. detect circuit 132 generally presents the signal DETECT in response to the signal CCLK.

The circuit 100 may have the advantages of both parallel crystal oscillators (in terms of accuracy) and of relaxation oscillators (in terms of instantaneous start up). The switch between the relaxation oscillator 102 and the crystal oscillator 130 may be controlled, in one example, by a counter. For example, a counter may count up to 20 before initiating a switch between the clocks (e.g., the signal RECLK and the signal CCLK). However, a maximum and/or minimum value to be counted to/from may be programmed in order to meet the criteria of a particular implementation. Furthermore, the value may be programmed by a control interface, control state machine, or another appropriate device in order to meet the criteria of a particular implementation.

Various oscillators may be implemented for the circuit 100. In one example, the relaxation oscillator 102 may be implemented as any appropriate oscillator that starts up immediately on power up. In another example, the crystal oscillator 130 may be implemented as a pierce crystal oscillator. The pierce crystal oscillator 130 may generate an accurate clock frequency after stabilizing. Once. the crystal oscillator 130 has stabilized, the substitute clock (e.g., RECLK) is replaced by the clock CCLK, and the inaccuracy of the substitute clock RECLK is compensated by speeding up or slowing down the crystal clock CCLK for a predetermined period. The predetermined period may be selected immediately after power up. Additionally, after the crystal clock CCLK has stabilized, the circuit 100 may not remove the clock RECLK. The clock RECLK may be implemented in conjunction with the clock CCLK. The logic block 104 may be implemented to compensate for inaccuracies in the clock RECLK accumulated from power-up until the clock CCLK has stabilized. However, after the compensation is completed, the logic block 104 may provide the accurate system clock CLK directly from the crystal clock CCLK.

The logic circuit 104 generally comprises a counter 140, a counter 142, a multiply block 144, a divide block 146, a control block 148 and a multiplexer 149. In one example, the counter 140 may be implemented as an up/down counter, the counter 142 may be implemented as a down counter, the multiplier 144 may be implemented as a multiply by 2 frequency multiplier, the divider 146 may be implemented as a divide by 2 frequency divider and the controller 148 may be implemented as a multiplexer and counter control circuit 148. However, the various components of the logic block 104 may be implemented as other appropriate type devices in order to meet the criteria of a particular implementation. In another example, the counter 140 may be implemented as an RC counter and the counter 142 may be implemented as a crystal counter.

The counter 140 may have an output 150 that may present a signal (e.g., INC) to an input 152 of the down counter 142.

The counter 142 may also have an input 154 that may receive a signal (e.g., CNTL1). The counter 142 may have an output 156 that may present a signal (e.g., DN) to an input 158 of the controller 148. In one example, the signal INC may be implemented as a data word, the signal DN may be implemented as an error data word and the signal CNTL1 may be implemented as a control signal. Additionally, the counter 142 may have an input 159 that may receive the signal CCLK. The controller 148 may have an output 160 that may present the signal CNTL1, an output 162 that may present a signal (e.g., SEL) to an input 164 of the multiplexer 149 and an output 164 that may present a signal (e.g., CNTL2) to an input 168 of the counter 140.

The multiplexer 149 may have a number of inputs 170a–170n. Additionally, the multiplexer 149 may present the signal CLK to the input 170a and may receive the signal RECLK. The input 170b may receive the signal CCLK, the input 170c may receive a multiplied CCLK signal (via the multiplier 144) and the input 170n may receive a divided CCLK signal (via the divider 146). The multiplexer 149 may multiplex the signals received at the inputs 170a–170n in response to the signal SEL. The signal SEL may be implemented, in one example, as a select signal. The multiplexer 149 may multiplex the signals RECLK, CCLK, multiplied CCLK and divided CCLK to present the signal CLK. The signal CLK may provide an accurate clock frequency to an external device (not shown).

A measure of the start up time of the crystal oscillator 130 is generally maintained by the relaxation oscillator 102. The counter 140 may count from power up to a start up of the crystal oscillator 130. After the crystal oscillator 130 has started up, the count of the counter 140 may be mapped to the crystal oscillator clock CCLK. The clock CCLK may be mapped by allowing the crystal oscillator clock CCLK to clock the counter 142. The startup count may be presented to the down counter 142 via the signal INC. The down counter 142 may count down from the crystal oscillator start up count until the up/down counter 140 counts down to zero. The count of the down counter 142 may then have the error count DN. The error count DN of the down counter 142 may be compensated by speeding up or slowing down the clock CCLK for an appropriate period of time.

From a point sufficiently far in time of the system clock CLK, there may be the same number of clock pulses as if the crystal oscillator 130 had started instantaneously at power up.

Figure 3:
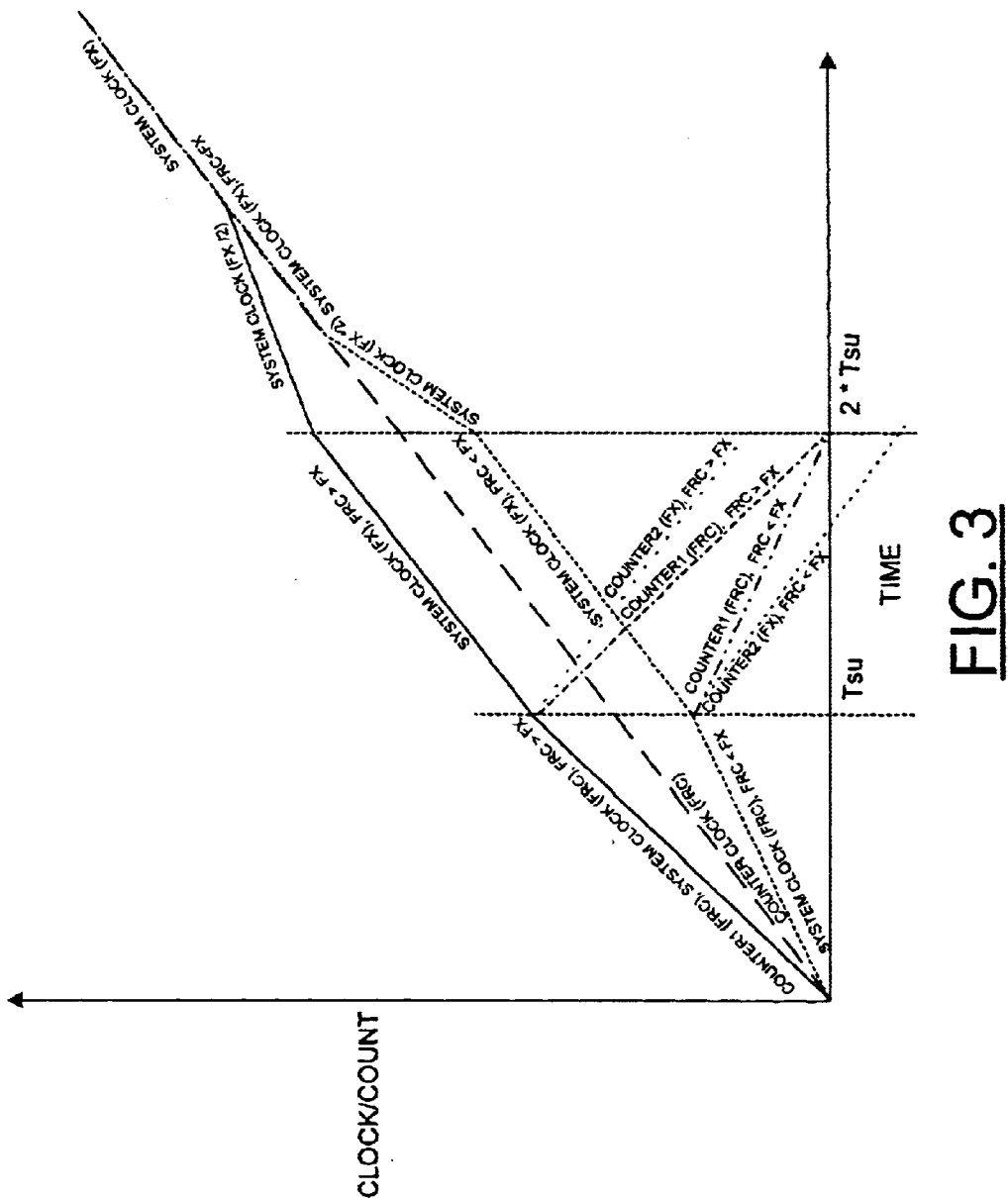
FIG. 3 is a graph illustrating various operations of the present invention.

Referring to FIG. 3, an example of a dual slope operations illustrating different times for different cases is shown.

At time=0

VCC is generally applied the RC oscillator 102 generally starts the crystal oscillator 130 may not have yet started the counter 140 may start to count UP an external device (not shown) may receive the system clock CLK from the RC oscillator 102 (e.g., the clock RECLK)

At time=Tsu (Start Up time)

the crystal clock CCLK generally stabilizes the count value of the up/down counter 140 may get loaded into the down counter 142 the up/down counter 140 and the down counter 142 may count down the system clock CLK may be switched to the crystal clock CCLK At time=2*Tsu the count value of the up/down counter 140 may reach zero the down counter 142 may remain with an error count (+VE or –VE)

The error±VE is generally compensated by adding or subtracting an equal number of crystal clock cycles into the system clock CLK.

The relaxation oscillator 102 may start up instantaneously after power up providing the system clock CLK. The up/down counter 140 may track the time until the crystal oscillator 130 builds up. The up/down counter 140 may count up with the RC clock RECLK. The crystal oscillator 130 may start up after a few ms delay from power up. Additionally, the crystal oscillator clock CCLK may be accurate once the crystal oscillator 130 builds up. The accurate clock CCLK may be implemented as the system clock CLK. The down counter 142 may be loaded with a value from the up/down counter 140 and both the counters 140 and 142 may start counting down. When the loaded start up value of the counter 140 becomes zero, the remaining value of the counter 142 may provide an error count of the system clock CLK. The error count may be compensated by selecting an appropriate multiple of the crystal clock CCLK (e.g., the multiplier block 144 or the divider block 146) or by blocking an appropriate number of crystal oscillator clock CCLK pulses. The total number of clocks of the system clock CLK may be equivalent to a number of clocks that would have passed, if the crystal oscillator 130 had started instantaneously after power up.

The system 100 may provide an accurate oscillator clock from startup. The accurate oscillator clock may be provided by linking the relaxation oscillator 102 based POR. Since the POR pulse duration is determined by a number of clock pulses, lifting of the POR may occur when the instantaneous start up oscillator (e.g., the RC oscillator 102) is generally oscillating. The system 100 may reduce usage of watchdog timer WDT for reset related system recovery. The RC oscillator 102 may provide for graceful degradation in environments where the crystal oscillator 130 either stops, stalls and/or fails (e.g., high "g" and high background EMI applications). The system 100 may speed up a time instant at which the crystal startup is no longer distinguishable by increasing the frequency at which the RC up/down counter 140 counts down. Additionally, the system 100 may proportionately increase the duration of which the up/down counter 140 reaches zero.

The system 100 may provide high accuracy from the point of power application to the chip. Additionally, the system 100 may provide high accuracy over a wide voltage and temperature variation. The system 100 may provide an accurate system clock (e.g., the clock CLK) from start up. When used to implement a RC oscillator power-on-reset (POR), in an incremental configuration, a zero power POR results. The system 100 may be a very robust solution for applications that require microprocessors to receive or respond to external events from powerup.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
    a first oscillator circuit configured to generate a first clock signal;
    a second oscillator circuit configured to generate a second clock signal; and
    a logic circuit configured to generate an output clock signal by selecting said first clock signal, generating a first count value by counting each cycle of said first clock signal during a start up time for said second clock signal, switching to said second clock signal, and generating a second count value by counting each cycle of said second clock signal during a next time lasting said start up time.

2. The apparatus according to claim 1, wherein said first oscillator circuit comprises a relaxation oscillator and said second oscillator circuit comprises a pierce crystal oscillator.

3. The apparatus according to claim 1, wherein said next time has a duration defined by said first count value.

4. The apparatus according to claim 1, wherein said logic circuit is further configured to switch to said second clock signal in response to a detect signal.

5. The apparatus according to claim 4, wherein said second oscillator circuit comprises:
    a detect circuit configured to generate said detect signal in response to said second clock signal stabilizing in frequency.

6. The apparatus according to claim 1, wherein said logic circuit is further configured to switch between said first and second clock signals after a predetermined time.

7. The apparatus according to claim 1, wherein said logic circuit is further configured to adjust an output frequency of said output clock signal in response to a difference between said first count value and said second count value.

8. The apparatus according to claim 7, wherein said logic circuit is further configured to adjust said output frequency of said output clock signal to a frequency of said second clock signal after compensating for said difference.

9. The apparatus according to claim 1, wherein said logic circuit comprises:
    a first counter configured to present said first count value; and
    a second counter configured to present said second count value in response to said first count value.

10. The apparatus according to claim 9, wherein said logic circuit further comprises a controller configured to control said first counter and said second counter in response to a detect signal.

11. A method for generating an output clock signal, comprising the steps of:
    (A) providing a first oscillating signal to a logic circuit;
    (B) generating a first count value by counting each cycle of said first oscillating signal during a start up time for a second oscillating signal;
    (C) switching said output clock signal from said first oscillating signal to said second oscillating signal; and
    (D) generating a second count value by counting each cycle of said second oscillating signal during a next time lasting said start up time.

12. The method according to claim 11, wherein step (C) further comprises selecting said first oscillating signal during said startup time and selecting said second oscillating signal after said start up time.

13. The method according to claim 11, wherein said start up time is determined in response to a detect signal.

14. The method according to claim 13, further comprising the step of:
    generating said detect signal in response to said second oscillating signal stabilizing in frequency.

15. The method according to claim 11, further comprising the step of adjusting an output frequency of said output clock signal in response to difference between said first count value and said second count value.

16. The method according to claim 15, further comprising the step of adjusting said output frequency of said output clock signal to a frequency of said second oscillating signal after compensating for said difference.

17. The method according to claim 11, further comprising the step of:

switching between said first oscillating signal and said second oscillating signal after a predetermined time.

18. The method according to claim 17, wherein said predetermined period of time comprises a programmable period.

19. An apparatus comprising:

a first oscillator circuit configured to generate a first clock signal;

a second oscillator circuit configured to generate a second clock signal; and a logic circuit configured to (A) generate an output clock signal by selecting (i) said first clock signal during a start up time of said second clock signal and (ii) said second clock signal after said start up time and (B) adjust an output frequency of said output clock signal after said start up time.

20. The apparatus according to claim 19, wherein said logic circuit is further configured to select said first clock signal to generate said output clock signal in response to stopping of said second oscillator circuit.

21. The apparatus according to claim 19, wherein said logic circuit is further configured to select said first clock signal to generate said output clock signal in response to failing of said second oscillator circuit.

* * * * *